Figure 1:
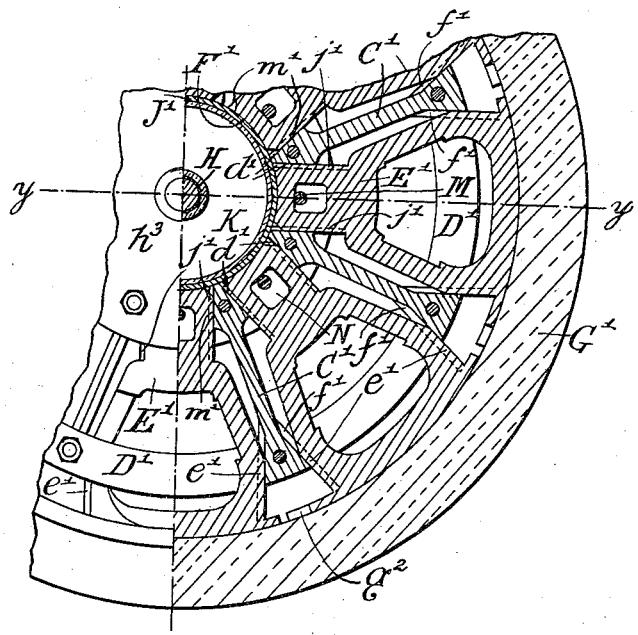

W. D. DOUGLAS-JONES.
WHEEL FOR ROAD VEHICLES.
APPLICATION FILED DEC. 16, 1909.

1,080,004.

Patented Dec. 2, 1913.

UNITED STATES PATENT OFFICE.

WALTER D. DOUGLAS-JONES, OF LONDON, ENGLAND.

WHEEL FOR ROAD-VEHICLES.

1,080,004. Specification of Letters Patent. Patented Dec. 2, 1913.

Application filed December 16, 1909. Serial No. 533,503.

*To all whom it may concern:*

Be it known that I, WALTER DOUGLAS DOUGLAS-JONES, a subject of the King of Great Britain, and residing at London, England, have invented certain new and useful Improvements in Wheels for Road-Vehicles, of which the following is a specification.

This invention relates to that type of wheels used for road vehicles generally in which resiliency is provided for within the bodies of the wheels instead of in the tires thereof, or in the tires thereof only, by sliding segments which transmit the pressure from the road surface to the hub or axle through an elastic medium placed around the hub or axle, each segment being considerably wider, as seen in side elevation of the wheel at its outer than at its inner end; and the invention has for its object to provide an improved construction of such wheel for use generally, but more especially for use with motor road vehicles.

Broadly stated, the invention consists in mounting each segment in the wheel frame in such a manner that it is guided as to its outer end by suitable guides parallel to each other, at or near each of its outer edges and guided also at some point or points at or toward its inner end which bears against the elastic medium placed around the hub or axle, such guides being arranged to allow only of the radial movement of the segment while retaining it in proper alinement with the wheel frame.

According to a preferred form of the invention the wheel frame is formed with a hub carrying a pair of disks one at each end leaving an annular channel between them within which an annular pneumatic cushion is provided. Mounted between the disks are fixed spokes which carry at or toward their outer ends, a pair of rings, oppositely disposed upon the spokes at either side of the wheel frame and rigidly secured to the spokes in any suitable manner. Radially slidable segments which project outward beyond the ends of the fixed spokes are mounted in the wheel frame which is constituted of the hub, disks, fixed spokes, and rings, so as to be capable of sliding at or near their outer ends along a pair of guides which are formed with or fixed to the fixed spokes or the rings aforesaid which are carried by the fixed spokes and so as to be slidable at their inner ends along a pair of guides which are formed with or fixed to a portion or portions of the wheel frame, but owing to the fact that the segments are narrower at their inner than at their outer ends, the guides at their inner ends will be the nearer together. In lieu of forming a pair of guides for the inner end of each segment, a single guide surface, such for instance as the interior of a socket may be employed through which the inner end of the segment may pass; and each of the guide surfaces for the outer end of a segment may consist of the interior of a socket through which a portion of the segment may pass.

The wheel tire may be either continuous or in separate sections, one section being carried at the outer end of each segment. The cushion around the hub or axle is preferably pneumatic and may be formed as a simple endless rubber tube provided with suitable means for inflating, in which case it is preferred to surround the tube with a metal band divided at some point in its length and preferably with its ends overlapping whereby the pressure of any segment may be spread over a more extended surface of the tube than would otherwise be the case. A cover of the kind which is used for a pneumatic tire may be used in place of the metal band, in which case sufficient space is provided between the disks to allow of the tube and cover spreading out sidewise under pressure from the segments.

Figure 2:
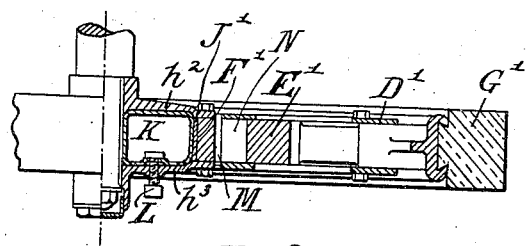

In the accompanying drawings, Figure 1 is a part side elevation and part sectional elevation of another form of the invention, Fig. 2 is, as to its left hand half, a plan, and, as to its right hand half, a sectional plan, of the wheel illustrated in Fig. 1, the section being taken in the plane indicated by the line $y\ y$ of that figure. Fig. 5 shows a modification of the invention hereafter described.

Referring now to the said drawings H is the wheel hub on which are mounted two disks $h^2$ and $h^3$ between which an annular pneumatic cushion is positioned. This cushion consists of a simple rubber tube K provided with suitable means L for inflating.

Fixed spokes C' are rigidly connected with the disks $h^2$ and $h^3$ and have a pair of rings D' D' rigidly fixed to their outer ends at opposite sides of the wheel.

E' are the sliding segments each of which is guided between a pair of spokes C'. Near the outer end of each segment E' a pair of V-shaped slides $e'$ is formed each of which slides within a V-shaped groove $f'$ formed in the opposing inner face of the corresponding fixed spoke at the outer end thereof. At the inner end of each segment E' is formed a pair of V-shaped slides $j'$ each of which slides within a V-shaped groove $d'$ formed in the opposing face $m'$ of the corresponding fixed spoke at the inner end thereof.

The inner face F' of each segment is suitably curved to conform with the shape of the outer surface of the air cushion K and between the segment and the air cushion, a steel band J' is provided divided at some portion of its length and with the ends overlapping. The outer faces of the segments are formed channel shape with undercut sides so as to receive the continuous rubber tread or tire G'. In order that the segments shall present a continuous bearing surface to the tread G' each segment has at each end a projecting portion $g^2$ which passes alongside a corresponding projecting portion on the adjacent segment; or in lieu thereof, one or each end of a section may carry a projecting portion which enters a recess in the opposing end of an adjacent section.

The pneumatic cushion K may be inflated by means of the nozzle L which passes through the disk $h^3$.

Pins M carried by the disks $h^2$ $h^3$ pass through a hollowed-out portion N of each segment and limit the outward movement of the segments.

The bearing surface F' is preferably of the greatest length admissible without risk of the inner end of one segment fouling the inner end of an adjacent segment. Each of the segments E' may be made comparatively light as shown.

The pressure against the tire causes each segment in turn to press inward against the steel band J' and transmit the pressure to the pneumatic cushion K, the steel band serving to spread the pressure over a greater length of the pneumatic cushion than corresponds with that of the bearing surface of the segment. The guides $f'$ at the outer ends of the spokes are considerably farther apart than the guides at the inner ends of the spokes, thus giving the outer end of each segment support at two surfaces distanced well apart.

In cases where the disk and ring on either or each side of the wheel are formed as one large disk, the fixed spokes aforesaid could be dispensed with by making such disk of sufficient strength.

Having fully described my invention what I claim and desire to secure by Letters Patent, is:—

1. In a wheel for a road vehicle, a wheel frame, an elastic cushion around the axis of the wheel, radiating segments which bear at their inner ends against said elastic cushion, a wheel tread having a portion thereof supported from the outer end of each said segment and each segment being of greater circumferential extent at its outer than at its inner end, a pair of parallel slides on each segment with which engage one of a number of pairs of parallel guides which are rigid with the frame and of which the guides of each pair are a considerable distance farther apart measured in the plane of the wheel than the average length of the actual bearing surface of the inner end of each segment on said elastic cushion when the load comes thereon, and which guide the outer end of the segment, and guides which guide the inner end of said segments, said guides allowing only a radial movement of the segments while retaining them in proper alinement with the wheel frame.

2. In a wheel for a road vehicle, a wheel frame comprising spokes which are rigid with the hub, means by which they are connected with one another at their outer ends, an elastic cushion around the axis of the wheel, radiating segments which bear at their inner ends against said elastic cushion, a wheel tread having a portion thereof supported from the outer end of each said segment and each segment being of greater circumferential extent at its outer than at its inner end, pairs of parallel guides for the outer ends of the segments each pair formed upon two adjacent spokes and situated a considerable distance farther apart than the normal length of the average bearing surface of the inner end of the corresponding segment on said cushion when the load comes thereon, and guides for guiding the inner ends of said segments.

3. In a wheel for a road vehicle, a wheel frame comprising spokes which are rigid with the hub, means by which they are connected with one another at their outer ends, an elastic cushion around the axis of the wheel, radiating segments which bear at their inner ends against said elastic cushion, a wheel tread having a portion thereof supported from the outer end of each said segment and each segment being of greater circumferential extent at its outer end than at its inner end, pairs of parallel guides for both the outer and inner ends of the segments, each pair formed upon two adjacent spokes and the guides of each pair for the outer ends of the spokes situated a considerable distance farther apart than the average length of the actual bearing surface of the inner end of the corresponding segment on said elastic cushion when the load comes thereon.

In witness whereof I have hereunto signed my name this 8th day of December, 1909, in the presence of two subscribing witnesses.

WALTER D. DOUGLAS-JONES.

Witnesses:
ALFRED H. WATKINS,
GLEESON E. ROBINSON.